US010522007B1

(12) United States Patent
Velline et al.

(10) Patent No.: US 10,522,007 B1
(45) Date of Patent: Dec. 31, 2019

(54) SERVICE MESSAGING SYSTEM AND METHOD FOR A TRANSACTION MACHINE

(71) Applicant: Wells Fargo Bank, N.A., San Francisco, CA (US)

(72) Inventors: Jonathan George Velline, Oakland, CA (US); Alicia Yi-Ping Moore, San Ramon, CA (US); Elizabeth Schrag, Walnut Creek, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 15/693,813

(22) Filed: Sep. 1, 2017

Related U.S. Application Data

(63) Continuation of application No. 14/987,276, filed on Jan. 4, 2016, now Pat. No. 9,754,461, which is a continuation of application No. 14/076,071, filed on Nov. 8, 2013, now Pat. No. 9,230,413, which is a continuation of application No. 13/441,777, filed on Apr. 6, 2012, now Pat. No. 8,602,296.

(60) Provisional application No. 61/473,053, filed on Apr. 7, 2011.

(51) Int. Cl.
*G06Q 40/00* (2012.01)
*G07F 19/00* (2006.01)

(52) U.S. Cl.
CPC .................................. *G07F 19/202* (2013.01)

(58) Field of Classification Search
CPC ...... G07F 19/20; G07F 19/201; G07F 19/211; G07F 9/026; G06Q 40/02; G06Q 20/1085; G06Q 20/20
USPC .......................................................... 235/379
See application file for complete search history.

(56) References Cited

U.S. PATENT DOCUMENTS

| | | | | |
|---|---|---|---|---|
| 4,839,504 | A | 6/1989 | Nakano | |
| 5,010,238 | A * | 4/1991 | Kadono | G06Q 40/02 235/379 |
| 6,067,621 | A | 5/2000 | Yu et al. | |
| 6,567,842 | B2 | 5/2003 | De Leo et al. | |
| 7,266,533 | B2 | 9/2007 | Karas et al. | |
| 7,416,112 | B2 | 8/2008 | Smith et al. | |
| 7,419,091 | B1 | 9/2008 | Scanlon | |
| 7,822,635 | B1 * | 10/2010 | Brown | G06Q 30/02 705/14.1 |
| 7,864,753 | B1 | 1/2011 | Barzegar et al. | |
| 7,886,971 | B2 | 2/2011 | Cassady et al. | |
| 8,020,754 | B2 | 9/2011 | Schwarz, Jr. | |

(Continued)

FOREIGN PATENT DOCUMENTS

JP 2007-316960 A 12/2007

OTHER PUBLICATIONS

Morrison, D., Gift Cards via ATMs, Credit Union Times Magazine & CUTBreakingNews, Dec. 12, 2012, 2 pages.

(Continued)

*Primary Examiner* — Thien M Le
(74) *Attorney, Agent, or Firm* — Foley & Lardner

(57) ABSTRACT

A method includes receiving identification information at a transaction machine, the identification information being associated with an account holder, accessing, using the identification information, activity profile information for the account holder, determining screen content for the transaction machine based on the activity profile information, and displaying the screen content to the account holder via a display screen of the transaction machine.

27 Claims, 7 Drawing Sheets

(56) References Cited

U.S. PATENT DOCUMENTS

| | | | |
|---|---|---|---|
| 8,156,042 B2 | | 4/2012 | Winkelman, III et al. |
| 8,255,318 B2 * | | 8/2012 | Royyuru ................ G06Q 20/40 705/35 |
| 8,396,794 B1 | | 3/2013 | Mo et al. |
| 8,474,699 B2 | | 7/2013 | Kolinski-Schultz et al. |
| 8,554,671 B2 | | 10/2013 | Ballout |
| 8,602,296 B1 | | 12/2013 | Velline et al. |
| 8,630,402 B1 * | | 1/2014 | Martinez ............. H04M 3/5233 379/265.01 |
| 8,635,158 B1 | | 1/2014 | Ledder et al. |
| 8,655,762 B2 | | 2/2014 | Abifaker |
| 8,690,051 B1 | | 4/2014 | Velline et al. |
| 8,731,997 B2 | | 5/2014 | Corbett et al. |
| 9,292,840 B1 | | 3/2016 | Velline et al. |
| 9,589,256 B1 * | | 3/2017 | Thomas ............. G06Q 20/1085 |
| 2002/0073050 A1 * | | 6/2002 | Gusler ................. G06Q 20/085 705/77 |
| 2002/0133409 A1 * | | 9/2002 | Sawano ................. G06Q 20/20 705/16 |
| 2003/0041244 A1 | | 2/2003 | Buttyan et al. |
| 2003/0093293 A1 | | 5/2003 | Han |
| 2004/0004116 A1 * | | 1/2004 | Hatanaka ............... G06Q 40/02 235/379 |
| 2004/0215566 A1 * | | 10/2004 | Meurer .................. G06Q 10/10 705/43 |
| 2005/0080727 A1 | | 4/2005 | Postrel |
| 2005/0161502 A1 | | 7/2005 | Smith et al. |
| 2005/0216744 A1 | | 9/2005 | Skygebjer |
| 2005/0269402 A1 | | 12/2005 | Spitzer et al. |
| 2005/0278222 A1 | | 12/2005 | Nortrup |
| 2006/0020542 A1 | | 1/2006 | Litle et al. |
| 2006/0168657 A1 | | 7/2006 | Baentsch et al. |
| 2006/0179304 A1 | | 8/2006 | Han |
| 2006/0287965 A1 | | 12/2006 | Bajan |
| 2006/0289630 A1 | | 12/2006 | Updike et al. |
| 2006/0294023 A1 | | 12/2006 | Lu |
| 2007/0030824 A1 | | 2/2007 | Ribaudo et al. |
| 2007/0037554 A1 | | 2/2007 | Freeny, Jr. |
| 2007/0162554 A1 | | 7/2007 | Branda et al. |
| 2007/0255653 A1 | | 11/2007 | Tumminaro et al. |
| 2007/0265948 A1 * | | 11/2007 | Maiorino ............... G06Q 40/00 705/35 |
| 2008/0052686 A1 | | 2/2008 | Jogand-Coulomb et al. |
| 2008/0086693 A1 | | 4/2008 | Jogand-Coulomb et al. |
| 2009/0037995 A1 | | 2/2009 | Zapata et al. |
| 2009/0064284 A1 | | 3/2009 | Poston et al. |
| 2009/0076934 A1 | | 3/2009 | Shahbazi et al. |
| 2009/0106158 A1 | | 4/2009 | Hill |
| 2009/0108015 A1 | | 4/2009 | Kreamer |
| 2009/0186690 A1 | | 7/2009 | Toth et al. |
| 2010/0030687 A1 | | 2/2010 | Panthaki et al. |
| 2010/0235283 A1 | | 9/2010 | Gerson |
| 2010/0332388 A1 | | 12/2010 | Rielly et al. |
| 2011/0137689 A1 | | 6/2011 | Chua et al. |
| 2011/0159850 A1 | | 6/2011 | Faith et al. |
| 2012/0016794 A1 | | 1/2012 | Orr et al. |
| 2012/0023019 A1 | | 1/2012 | Hartfield et al. |
| 2012/0066127 A1 | | 3/2012 | Kingston et al. |
| 2012/0185322 A1 | | 7/2012 | Shipley |
| 2012/0185388 A1 | | 7/2012 | Pranger |
| 2012/0245987 A1 | | 9/2012 | Isaacson et al. |
| 2012/0278234 A1 | | 11/2012 | Dent et al. |
| 2012/0292388 A1 * | | 11/2012 | Hernandez ........... G06Q 20/108 235/379 |
| 2013/0024239 A1 * | | 1/2013 | Baker .................... G06Q 40/06 705/7.28 |
| 2013/0046810 A1 | | 2/2013 | Loew |
| 2013/0310163 A1 * | | 11/2013 | Smith ................. G07F 17/3241 463/26 |
| 2013/0325671 A1 | | 12/2013 | Glass et al. |
| 2014/0032372 A1 | | 1/2014 | King et al. |
| 2014/0089188 A1 | | 3/2014 | Rao |
| 2014/0129440 A1 | | 5/2014 | Smith et al. |
| 2014/0164762 A1 | | 6/2014 | Lee et al. |
| 2014/0245392 A1 | | 8/2014 | Masters et al. |
| 2014/0279527 A1 * | | 9/2014 | Duke ................. G06Q 20/4016 705/44 |
| 2015/0025950 A1 | | 1/2015 | Yu |
| 2015/0066748 A1 | | 3/2015 | Winslow et al. |
| 2015/0088650 A1 | | 3/2015 | Taylor et al. |
| 2015/0136850 A1 | | 5/2015 | Akahane |
| 2016/0098709 A1 | | 4/2016 | Johnson |
| 2016/0358162 A1 | | 12/2016 | Park et al. |

OTHER PUBLICATIONS

Talbot, M., Commentary: Banking and social media: Where is it going?, ATM Marketplace, Aug. 30, 2012, retrieved from the Internet at http://www.atmmarketplace.com/articles/commentary-banking-and-social-media-where-is-it-going-2/ on Dec. 12, 2016, 2 pages as printed.

* cited by examiner

SERVICE MESSAGING SYSTEM AND METHOD FOR A TRANSACTION MACHINE

CROSS-REFERENCE TO RELATED APPLICATIONS

This application is a continuation of U.S. patent application Ser. No. 14/987,276, filed Jan. 4, 2016, which is a continuation of U.S. patent application Ser. No. 14/076,071, filed Nov. 8, 2013, which is a continuation of U.S. patent application Ser. No. 13/441,777, filed Apr. 6, 2012, which claims the benefit of U.S. Provisional Application No. 61/473,053, filed Apr. 7, 2011. The entire contents of Ser. No. 14/987,276, 14/076,071, 13/441,777, and 61/473,053 are hereby incorporated by reference in their entirety and for all purposes.

BACKGROUND

Financial institutions provide various ways for customers to access account information and perform transactions, such as transaction machines, websites, and brick and mortar locations (e.g., retail bank branches). Transaction machines, such as automated teller machines (ATMs), may be accessed at various geographic locations, such as bank locations, convenience stores or other stores to facilitate the account holder's interaction with banking systems. Transaction machines accept transaction cards such as debit, credit or stored value cards that are often used by account holders to purchase items or services or to obtain funds.

SUMMARY

According to an example embodiment, identification information is received from a transaction card at a transaction machine. The transaction card is associated with an account holder using the transaction machine. Using the identification information, activity profile information is accessed for the account holder. A service-related message is generated based on the activity profile information. Screen content including the service-related message is displayed to the account holder via a display screen of the transaction machine.

According to an example embodiment, an automated teller machine system comprises a display, a dispensing device, a deposit device, a transaction card reader, user interface generation logic. The transaction card reader receives identification information from a transaction card. The transaction card is associated with an account holder using the automated teller machine. The user interface generation logic is configured to access activity profile information for the account holder. The user interface generation logic is configured to generate a service-related message to be displayed to the account holder based on the activity profile information. The display is configured to display screen content including the service-related message to the account holder at the transaction machine.

DETAILED DESCRIPTION OF EXAMPLE EMBODIMENTS

Figure 1:
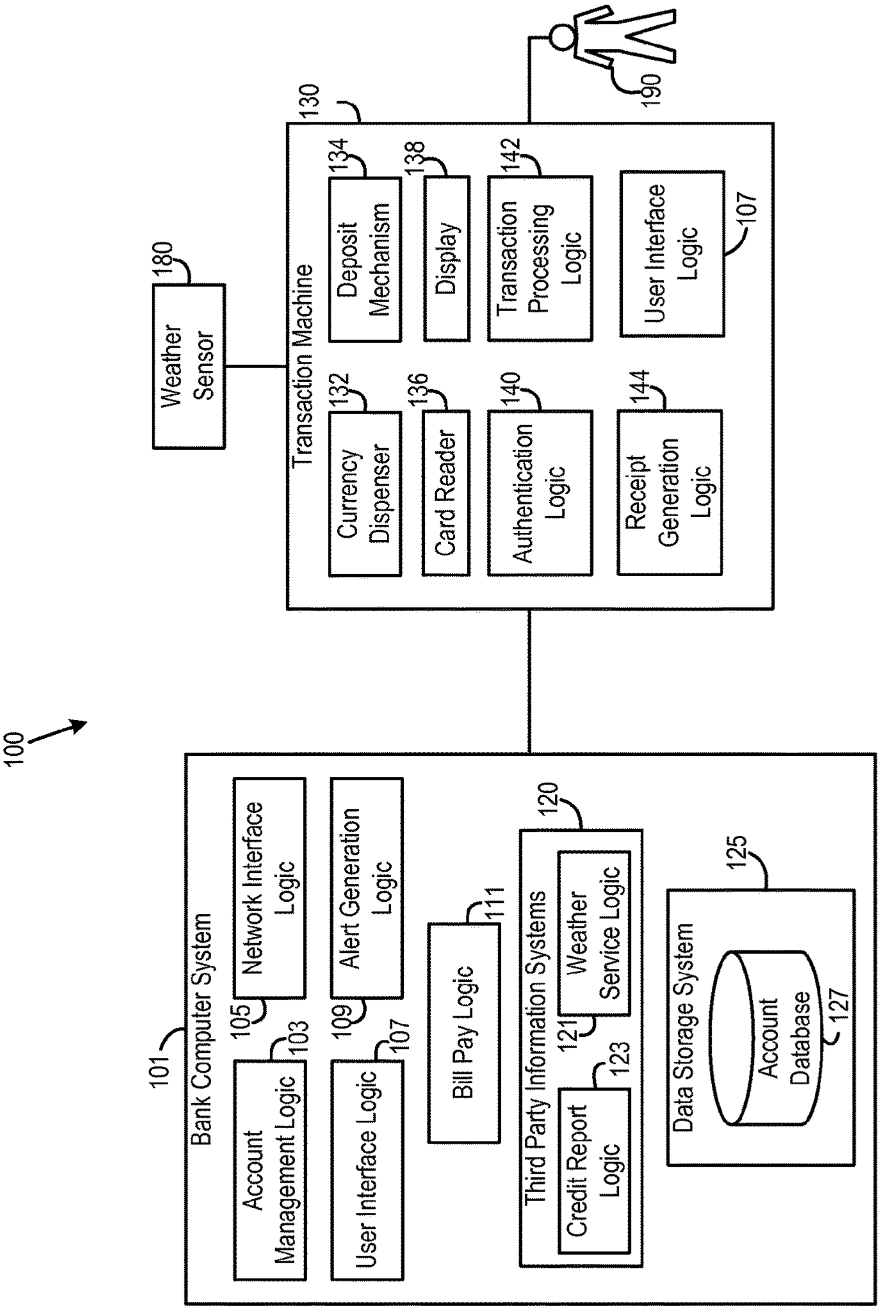
FIG. 1 is a schematic diagram of a system that includes a transaction machine that communicates with a bank computer system.

Referring to FIG. 1, FIG. 1 shows a system 100 according to an example embodiment. The system 100 may include a bank computer system 101 and one or more transaction machines 130, such as an automated teller machines (ATMs). The system 100 may be accessed by an account holder 190 who seeks to perform a financial transaction, obtain account information, access other products/services, and so on.

In an example embodiment, the bank computer system 101 may be provided or controlled by a bank or other financial institution and the users may be the customers or account holders of the financial institution. The users may access the bank computer system 101 through tellers at retail bank branches, through the Internet, or through the transaction machine 130. In FIG. 1, for example, an account holder 190 is shown accessing the bank computer system 101 through the transaction machine 130. In practice, the bank computer system 101 may include server computing systems, for example, comprising one or more networked computer servers having a processor and non-transitory machine readable media. The logic or logics described herein may therefore be implemented as program logic that is stored on the machine-readable media and that, when executed by the processor, causes the processor to perform the operations described herein.

As described in greater detail below, the bank computer system 101 and the transaction machine 130 may cooperate to provide a user interface at the transaction machine 130 that is customized to the user. For example, the user interface may be customized to provide a high level menu that includes menu options for services/transactions that the customer uses most frequently or that are otherwise determined to be currently most pertinent to the user. Likewise, the user interface may be customized to make other services/transactions available through additional lower level menus. The customization may be made based on the activity profile information for the customer, including information about previously performed transactions, customer personas, preferences specified by the user (e.g., relating to font size, background image content, etc.), and so on. Customization of the user interface is described in greater detail below in connection with FIGS. 2-8.

The bank computer system 101 may further include, among other systems, account management logic 103, network interface logic 105, user interface logic 107, alert generation logic 109, bill pay logic 111, third party information systems interface logic 120, and data storage system 125. Account management logic 103 may perform various tasks in connection with accounts held by account holders at the financial institution, such as account processing (processing of account debits and credits), authentication, statement generation, account status, funds transfers, and so on. Account management logic 103 may also maintain a log of all transactions that occurred in the past and store data related to the account in a data storage system 125.

Network interface logic 105 may be used to connect the bank computer system 101 to communicate with other systems such as the transaction machine 130. An embodiment of the network interface logic 105 may be configured to communicate with the transaction machine 130 over a proprietary encrypted network. Another embodiment of the network interface logic 105 may be configured to communicate with the transaction machine 130 over a public encrypted network. The network interface logic 105 may also connect to the Internet to permit account holders access the bank computer system 101 through an on-line banking area of a website of the bank. Network interface logic 105 may also comprise other logic that is configured to provide an interface for other types of devices such as mobile devices (including cell phones, smart phones, mobile slate or pads), fax machines, and server-based computing systems.

User interface logic 107 may generate customized menus and menu options. As previously indicated, the computer system 101 and the transaction machine 130 may cooperate to provide a customized user interface at the transaction machine 130. As indicated in FIG. 1, the user interface logic 107 may comprise program logic located at the bank computer system 101, at the transaction machine 130, or at both the bank computer system 101 and the transaction machine 130. That is, the operations described herein as being performed by the user interface logic 107 may be performed either at the bank computer system 101, at the transaction machine 130, or at both the bank computer system 101 and the transaction machine 130. The user interface logic 107 generates a graphical user interface for presentation to the account holder 190 at the transaction machine 130 via a display 138. The user interface logic 107 may receive information, adjust the menu options on the display 138 according to data provided by the user interface logic 107. Other configurations are also possible, some of which are described below. The user interface logic 107 is discussed in greater detail below in connection with FIGS. 2-8.

Alert generation logic 109 may generate alerts for account holders. For example, the alert generation logic 109 may track information regarding the due dates of various bills generate alerts regarding an account holders past due bills or bills due in the near future. The alert generation logic 109 may also generate alerts regarding other account activity, e.g., alerts about possible fraudulent transactions.

Bill pay logic 111 may be configured to receive bill related information including the third party account number, due date and amount due. In various embodiments, the bill pay logic 111 may allow the account holder 190 to make the payment on a future date. In other embodiments, the bill pay logic 111 may allow the account holder 190 to choose to pay the bill on the same day.

Third party information systems interface logic 120 may include logic (such as weather service logic 121 and credit report logic 123) for receiving and processing information received from third party information systems. The third party information systems 120 may receive information from various sources outside the bank computer system 101. For example, the weather service logic 121 may receive weather information (e.g., for the location of the transaction machine 130) and the credit report logic 123 may receive information from various credit agencies. The manner in which such information may be processed is discussed in greater detail below.

The data storage system 125 may include an account database 127. The account data base 127 can be structured according to various database types, such as, relational, hierarchical, network, flat or object relational. The account database 127 may be configured to store account balances and a log of each transaction processed by the account management logic 103. The account database 127 may be configured store other activity profile information such as account preferences the user has specified, background pictures the user has uploaded, and so on.

The transaction machine 130 may, for example, be an automated teller machine, a point of sale device, or other device. For example, the transaction machine 130 may include a currency dispenser 132, deposit mechanism 134, card reader 136, display 138, authentication logic 140, transaction processing logic 142, and receipt generation logic 144. Other hardware may also be included, such as a keypad or buttons for receiving user inputs.

The currency dispenser 132 may dispense currency notes ("cash") to an account holder 190 from their financial institution accounts. The currency dispenser 132 may be configured to dispense currency in various denominations, as specified by the account holder 190. The deposit mechanism 134 may be configured to accept deposits, such as envelop or envelop-free deposits of cash and/or checks.

The card reader 136 may be configured to scan information from a magnetic stripe ("magstripe") of a transaction card. The card reader 136 may be configured to read information from a credit card, debit card, ATM card, stored value card, or the like. While performing the read operation, the card reader 136 may be configured to read the account information and the PIN associated with the card and the account.

The display 138 may be configured to display graphics such as menus, instructions, background photos (e.g., advertisements, etc.), logos, and so on. In one embodiment, the display 138 is a touch screen display that is capable of detecting user touches, e.g., to make menu selections. The display 138 allows the account holder 190 to interact with the transaction machine 130 in order to process transactions. The transactions may include withdrawing funds, purchasing one or more goods or services, transferring funds from one account to another account, paying a bill or mortgage and so on. The display 138 may be used to display various customized menu options transactions to the account holder 190.

The authentication logic 140 may be configured to authenticate information received by the transaction machine 130 to approve or reject a transaction. The information authentication logic 140 may approve or deny authentication for transaction data received by transaction machine 130. The authentication logic 140 authenticates a user as being a valid account holder associated with the transaction card and the corresponding account at the bank or financial institution.

The transaction processing logic 142 processes each transaction requested by the account holder 190. For example, the transaction processing logic 124 may cooperate with the account management logic 103 of the bank computer system 101 to ensure that transactions are properly debited/credit to the account held by the account holder 190. The receipt generation logic 144 generates a receipt for each transaction.

As previously indicated, the transaction machine 130 may also include user interface logic 107. The user interface logic 107 generates a graphical user interface for presentation to the account holder 190 at the transaction machine 130 via the display 138. The user interface logic 107 is discussed in greater detail below in connection with FIGS. 2-8.

Figure 2:
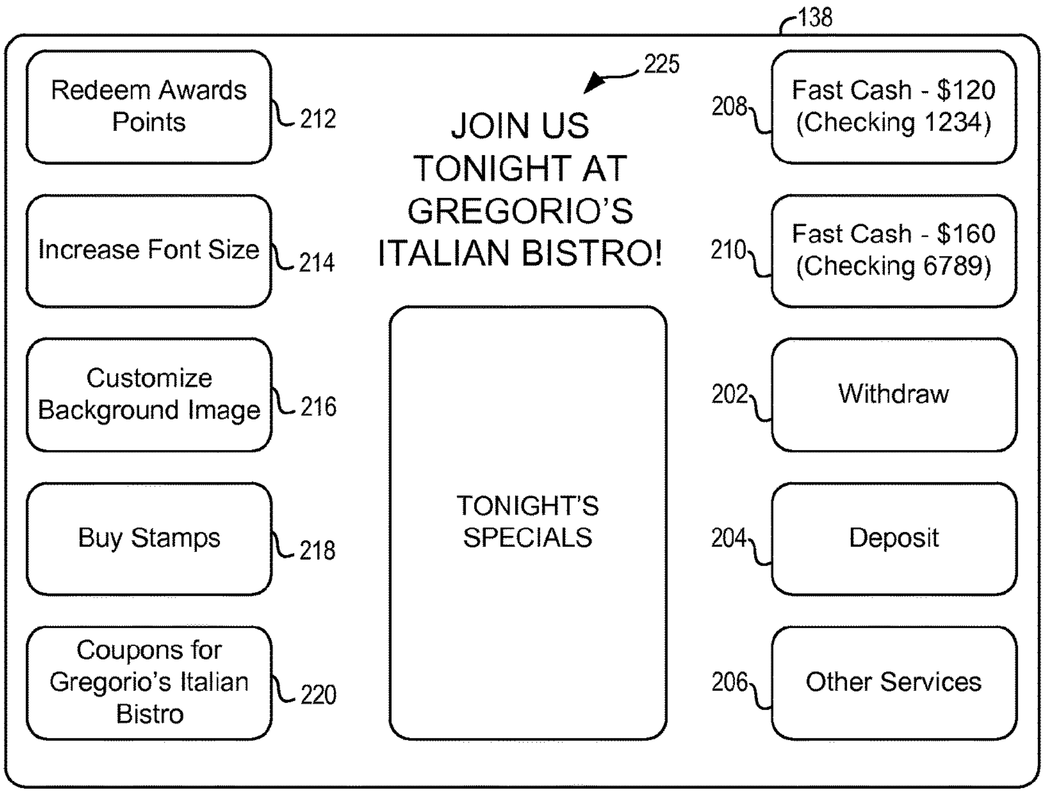
FIG. 2 is an example menu that can be displayed on a transaction machine from FIG. 1.

Referring now to FIG. 2, an example of a customized user interface 200 that may be generated and displayed to the user at the display 138 is shown. As shown in FIG. 2, the user interface comprises a plurality of menu options 202-220 that may be selected by the user. The menu options may include, for example, a plurality of standard menu options 202-206 that are provided to all users, e.g., because they are relatively basic/commonly used options that are likely to be of interest to all users. In the example of FIG. 2, these menu options include an option 202 to withdraw funds, an option 204 to deposit funds, and an option 206 to view more options.

The menu options may further include an additional plurality of standard menu options 208-210 that are provided to all users, although the precise nature of the menu option may vary from user to user. Hence, for example, in FIG. 2, the user is provided with two menu options that permit the user to quickly perform (with minimal/no further entry of information) transactions identical to transactions the user has frequently performed in the past. However, the precise nature of the transaction to be performed (e.g., dollar amount, account number) may vary from user to user. For example, in FIG. 2, menu option 208 permits the user to withdraw $120 from one checking account and menu option 210 permits the user to withdraw $160 from another checking account. Other users may similarly be provided with two menu options to quickly perform transactions. For those users, however, the dollar amounts and account numbers may be different.

The menu options may also include an additional plurality of non-standard menu options 212-220 that are only occasionally presented to users or that are only presented to users after a determination has been made that such menu options are likely to be useful to the user. In the example of FIG. 2, these menu options include a menu option 212 to redeem awards points, a menu option 214 to increase font size, a menu option 216 to customize a background image, a menu option 218 to buy stamps, and a menu option 220 to receive coupons in connection with an offer 225 that is being made through the transaction machine 130. Menu options 208-220, along with other menu options that may be used in connection with a customized user interface, are described in greater detail below.

Figure 3:
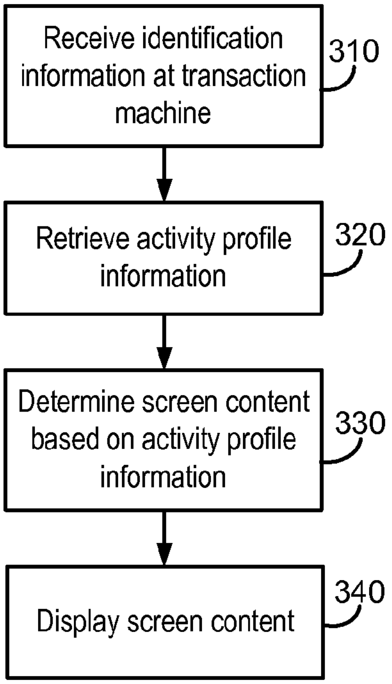
FIG. 3 shows an overall process for generating a customized user interface.
Figure 4:
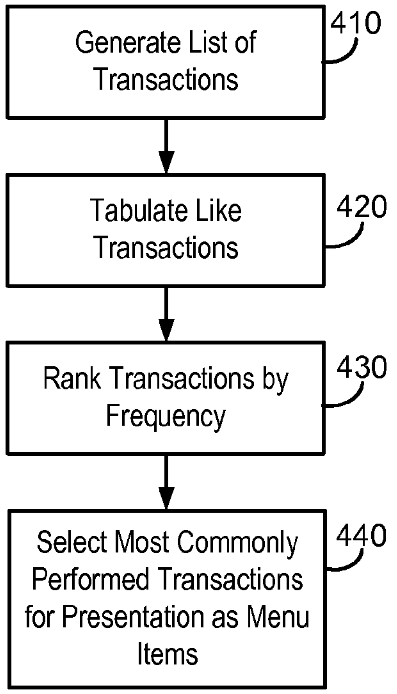
FIG. 4 shows a process for providing the user with standard menu options that include content that is customized to a particular user.
Figure 5:
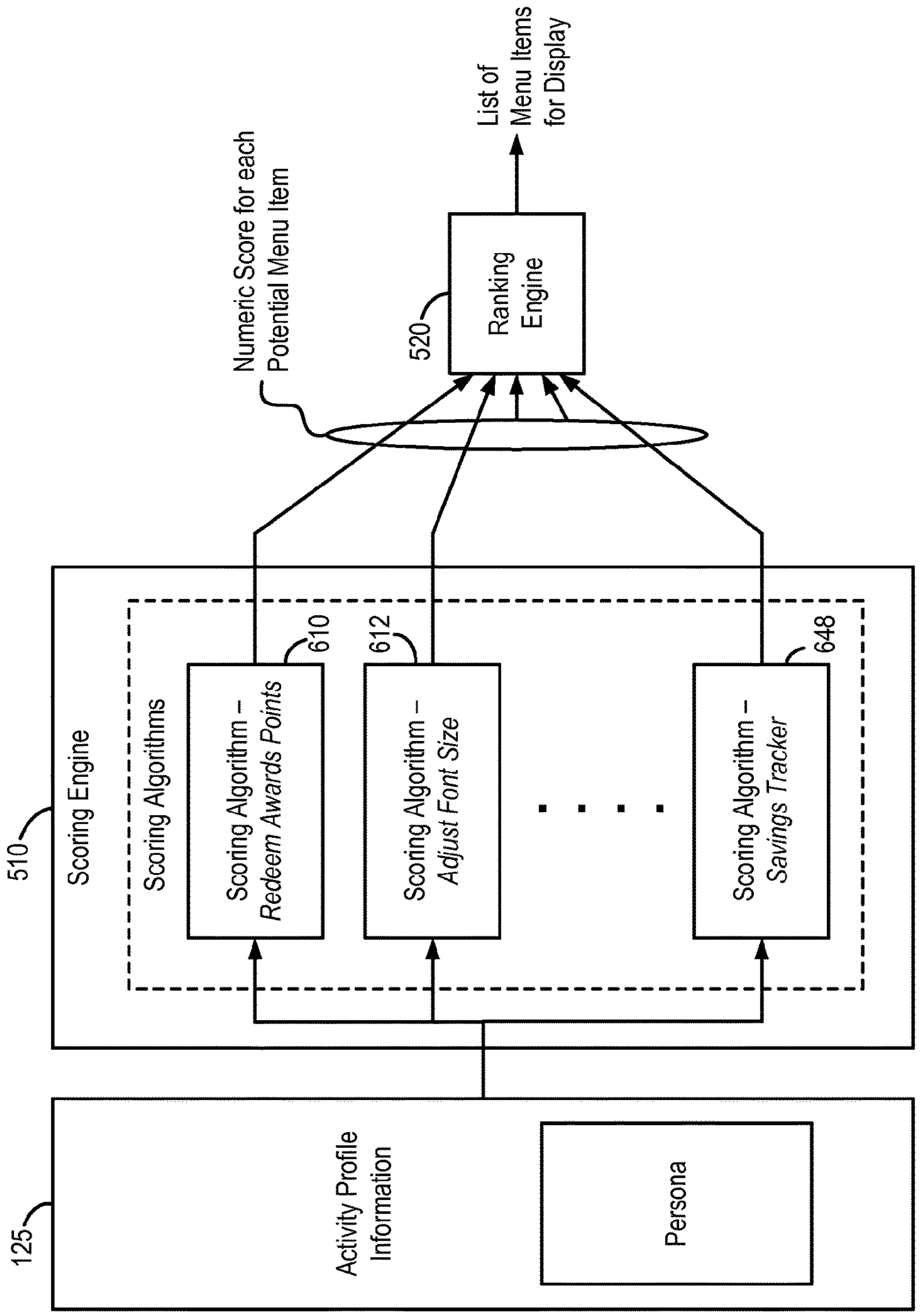
FIG. 5 shows program logic that may be used to select non-standard menu options for presentation to the user.
Figure 6:
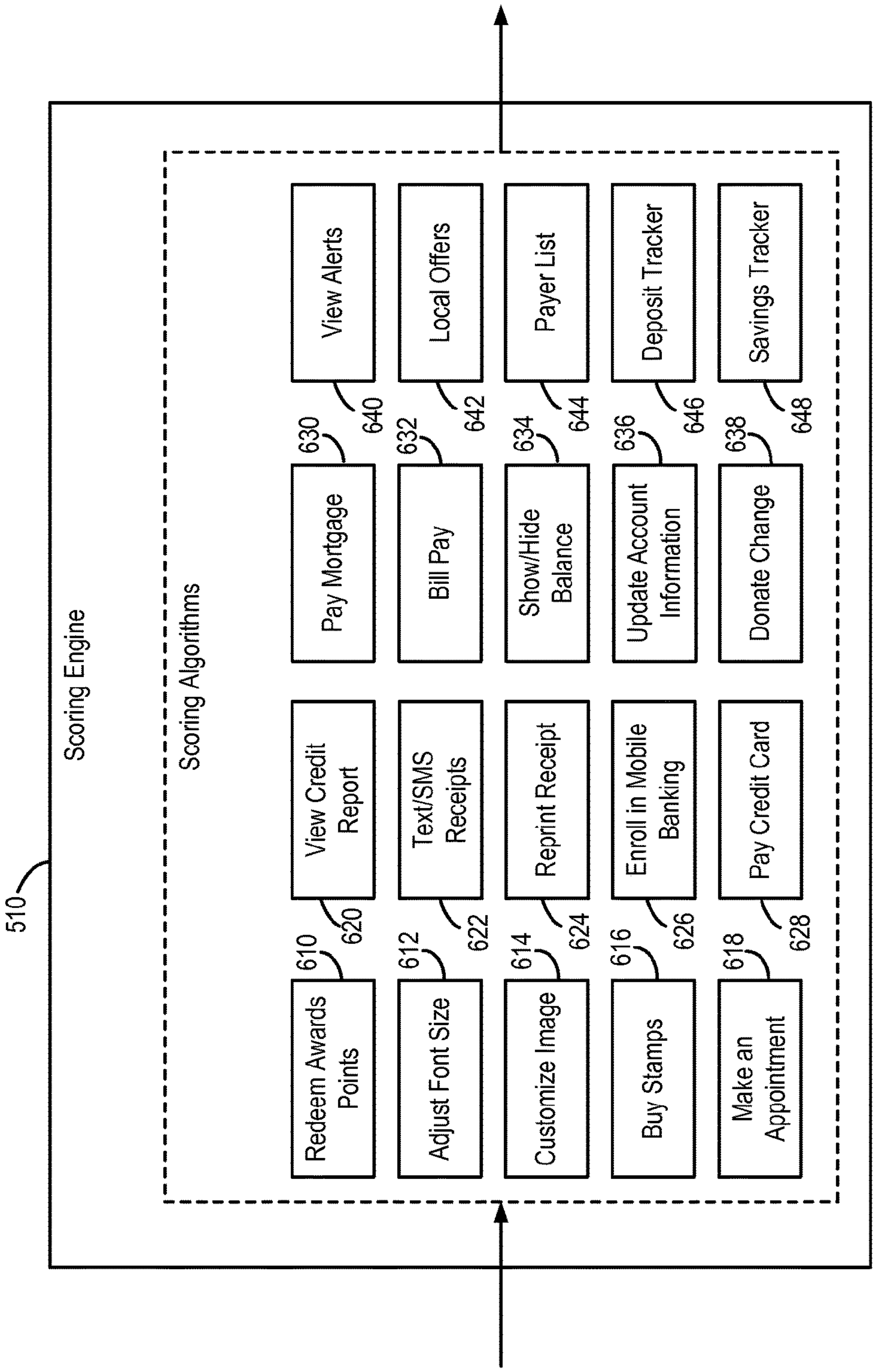
FIG. 6 shows a scoring engine of FIG. 5 in greater detail.

Referring now to FIGS. 3-6, operation of the user interface logic 107 to generate a customized user interface is described in greater detail. FIG. 3 shows an overall process for generating a customized user interface. FIG. 4 shows a process for providing a high level menu that includes menu options for services/transactions that the customer uses most frequently. FIG. 5 shows program logic that may be used to select non-standard menu options for presentation to the user based on other activity profile information. FIG. 6 shows a scoring engine of FIG. 5 in greater detail.

Referring to FIG. 3, FIG. 3 shows an overall process for generating a customized user interface. At step 310, identification information is received by a transaction machine 130 when an account holder 190 accesses the transaction machine 130 using a transaction card. The user interface logic 107 accesses the activity profile information at step 320. Next, at step 330, the user interface logic 107 determines the screen content based on the activity profile information. The display 138 displays the screen content provided by the user interface logic 107, at step 340.

Referring to FIG. 4, FIG. 4 shows a process for providing a high level menu that includes menu options for services/transactions that the customer uses most frequently. At step 410, the account database 127 is accessed to generate a list of transactions that the user has performed. The transactions may, for example, be transactions that have occurred during a predetermined preceding time period (e.g., during the prior year). Additionally, the transactions may span all accounts that are accessible via the particular ATM card that the user has inserted into the transaction machine. In one embodiment, only transactions that occurred at a similar type of transaction machine are included in the list. For example, if the user is at an ATM, then only ATM transactions are included in the list and transactions that occurred at a point-of-sale device may be disregarded. In other embodiments, all transactions are included in the list.

The transactions are then tabulated (step 412) and ranked (step 414) according to dollar amount and account number. By way of example, the ranking may show that the user has made the following withdrawals:

| Rank | Count | Account Number | Dollar Amount |
|---|---|---|---|
| 1 | 7 | personal checking - 1234 | $120 |
| 2 | 4 | business checking - 6789 | $160 |
| 3 | 3 | personal checking - 1234 | $100 |
| 4 | 3 | personal checking - 1234 | $80 |
| 5 | 2 | business checking - 6789 | $100 |
| 6 | 1 | savings - 1234 | $200 |
| 7 | 1 | personal checking - 1234 | $400 |

In this example (corresponding to the example menu of FIG. 2), the two most frequently performed withdrawals are $120 from a first account and $160 from a second account. The two menu options presented to the user may then be "Fast Cash—$120 (Checking—1234)" and "Fast Cash—$160 (Checking—6789)."

Referring to FIG. 5, FIG. 5 shows program logic that may be used to select non-standard menu options for presentation to the user. As will be appreciated, in addition to transactions such as withdrawing cash, it may be desirable to provide the customer with the ability to perform other transactions and access other services. As the number of menu options increases, however, at some point, it may be difficult or undesirable as a practical matter to present the customer with all of the potential menu options that are available. Accordingly, the user interface logic 107 may be configured to select menu options to be displayed to the user on a customized basis based on activity profile information for the user.

As shown in FIG. 5, the user interface logic 107 comprises a scoring engine 510 and a ranking engine 520. In FIG. 5, it is assumed that there are numerous potential menu options that may potentially be displayed to the customer. The scoring engine 510 assigns a score to each potential menu option (e.g., each menu option may be rated on a scale ranging from zero to ten). The score is generated by an algorithm that is configured to provide an assessment as to how pertinent the menu option is to a particular user. The ranking engine 520 then ranks the menu options and selects a predetermined (e.g., the five menu options that scored highest on the scale from zero to ten) for presentation to the user. The other menu options that received lower scores are not displayed to the user on the highest level menu (i.e., the first menu that is presented to the user), but may be made available through lower level menus (i.e., if the user selects the menu option 206 for other services in FIG. 2).

As will be appreciated, and as described in greater detail in connection with FIG. 6 below, different types of scoring algorithms may be used for different menu options. For example, a simple binary scoring mechanism may be used.

That is, if condition A is true, then a score of zero is assigned. If condition A is false, then a non-zero score is assigned. Assuming scores are assigned on a scale of zero to ten, then the non-zero score that is assigned may be ten or it may be a smaller number (e.g., seven or eight, if the menu option is considered inherently less important than other menu options). (As will be appreciated, not all values ranging from zero to ten need be possible output scores of a given scoring algorithm.) More conditions may also be used to achieve a greater range of possible output scores (e.g., if A and B are false, then score=0; if A is true and B is false, then score=3, if A is false and B is true, then score=6, if A and B are both true, then score=9). For example, additional condition(s) may be used that examine whether the menu option has been displayed to the user during a predetermined preceding time period(s). For example, a first condition may examine whether the menu option has been displayed to the user within the preceding three months (resulting in a first non-zero score), and a second condition may examine whether the menu option has been displayed to the user within the preceding six months (resulting in a second, higher non-zero score). Hence, the fact that the user has not seen the menu option recently may be activity profile information that may be used as a basis for determining that the menu option should be considered pertinent and should be presented to the user. Linear and non-linear equations may also be used to generate scores; for example, a scoring algorithm may be used that provides an estimate of the probability of a particular event occurring, and the score may be proportional to the probability of the event occurring. As will also be appreciated, the scores may be integers or they may be non-integer values (e.g., multiple scoring algorithms may be used where the score is the output of a linear equation, scaled between zero to ten, and rounded to three decimal places). Other arrangements are also possible.

Referring now also to FIG. 6, FIG. 6 shows scoring engine 510 of FIG. 5 in greater detail. As shown in FIG. 6, the scoring engine 510 may comprise a separate scoring algorithm for each menu option that may potentially be displayed to the user (shown as scoring algorithms 610-648). In each case, activity profile information for the user is accessed from database 127 and used to generate a score for the menu option.

For example, a menu option may be provided to the user to redeem awards points in exchange for cash, account credits, or other rewards. For example, the score that is assigned may be determined by scoring algorithm 610 based on the total number of points to be redeemed, that is, with a higher the number of points resulting in a higher score, and a score of ten being assigned once a predetermined threshold is reached. For example, the threshold may be the same for all users (e.g., $1000) or may be customized to this particular user (e.g., the dollar value of points that were redeemed the last time the user decided to redeem points). Lower amounts of points may be assigned proportionally lower scores.

As another example, a menu option may be provided to the user to adjust the font size of the menu options and the text on the display 138. Activity profile information for the user is accessed from database 127 to determine whether the user has accessed a menu at a transaction machine that included on option to adjust the font size. The score that is assigned to the menu option may be determined by scoring algorithm 612 based on the amount of time (or the number of visits to a transaction machine) it has been since the user last viewed a menu option to adjust font sizes. If the font size is adjusted, the user may then be presented with the new font size during future visits to transaction machines. In another embodiment, the score may take into account recent transactions recorded in the account database. For example, if credit card transactions of the user include a transaction at an optician or at a store that sells corrective eyewear, then a higher score may be assigned to the font size menu option by the scoring algorithm 612.

As another example, a menu option may be provided to the user to select a new background image. For example, the user may be permitted to select from a variety of standard background images available at the transaction machine 130. As another example, the user may be permitted to upload a new background image through an on-line banking website provided by the bank computer system 101. In one embodiment the background picture 560 may be a message that the account holder 190 or another individual such as a relative has uploaded (e.g., "Happy birthday, Mom!)". The score that is assigned to the menu option by scoring algorithm 614 may be determined based on the amount of time (or the number of visits to a transaction machine) it has been since the user since the user last viewed a menu option to select a custom image. In another embodiment, if the user has recently uploaded images to the bank computer system 101, then a higher score may be assigned. Such images may, for example, be uploaded by the user to a data storage system offered as a service to customers, such as that disclosed in U.S. Ser. No. 12/290,299, entitled "Document Storage System and Method," filed Oct. 29, 2008, hereby incorporated by reference.

As another example, a menu option may be provided to the user to purchase stamps. The score that is assigned to the menu option may be determined by scoring algorithm 616 based on whether the user has purchased stamps in the past, how often the user has purchased stamps in the past, and the amount of elapsed time since the user purchased stamps. For example, if the user purchases stamps once a month, and it has been about a month since the user purchased stamps, then this menu option may be assigned a higher score. Even if the user typically does not purchase stamps, a decision may be made to make the offer on a regular basis (e.g., approximately once every six months). Hence, if a certain amount of time has passed since the offer has been made (e.g., six months), then this menu option may be assigned a higher score.

As another example, a menu option may be provided to the user to make an appointment at a nearby bank branch. U.S. Ser. No. 13/028,177, entitled, "Computerized Appointment Scheduling System and Method," filed Feb. 15, 2011, hereby incorporated by reference, discloses, inter alia, a system and method that allows users to schedule appointments at bank branches. The score that is assigned to this menu option may be determined by scoring algorithm 618 based on menu navigation activity during the current visit at the transaction machine 130. For example, the score may increase each time the user presses a menu button at the transaction machine but does not perform a transaction. Thus, if it appears that the user is searching through menus at the transaction machine 130, but cannot seem to find what they need, then a menu option may be presented that would permit the user to make an appointment at a local bank branch.

As another example, a menu option may be provided to the user to view their credit report. The score that is assigned to the menu option may be determined by scoring algorithm 620 based on whether the user has previously reported fraudulent transactions in connection with their accounts and based on the amount of time that has elapsed since the user last viewed their credit report. For example, a user that has been a victim of identity theft may have a heightened interest in reviewing their credit report on a regular basis. The credit reporting logic 123 may access the credit report data from the credit agencies and may send the data to user interface logic 107 for presentation to the user. Again, it may also be desirable to present the user with the menu option to view their credit report on a periodic basis, even if there has not been any indication of fraud in the past.

As another example, a menu option may be provided to the user to receive SMS/text receipts for transactions at ATMs rather than paper receipts. In various embodiments, the user may be permitted to specify various options regarding receipt delivery, such as via an e-mail, text message or online though a banking website. The score that is assigned to the menu option may be determined by scoring algorithm 626 based on the amount of time (or the number of visits to a transaction machine) it has been since the user since the user last viewed a menu option to receive SMS/text receipts.

As another example, a menu option may be provided to the user to reprint a paper receipt. This menu option may accompany the menu option to receive SMS/text receipts. This may provide reassurance to the user that the user can reprint a paper receipt if an SMS/text receipt is not received. This menu option may also be provided regularly to users that receive SMS/text receipts, such as once per month. The user may then be provided with information regarding transaction conducted during the preceding month. The user may also be presented with an option to provide an e-mail address or a mobile phone number to the transaction machine 130. In another embodiment, the account holder's e-mail or mobile phone number may be known by the bank computer system 101.

As another example, a menu option may be provided to the user to enroll in mobile banking. For example, the user interface logic 107 may request the user's mobile phone number and send an authentication code to the user's mobile phone. In order to process the mobile text banking enrollment, the user interface logic 107 may request that the user enter the authentication code into the transaction machine 130. The score that is assigned to this menu option may be determined by scoring algorithm 626 based on the amount of time (or the number of visits to a transaction machine) it has been since the user since the user last viewed a menu option to enroll in mobile banking.

As another example, a menu option may be provided to the user to pay a credit card bill, for example, in a situation in which the user has a credit card account at the bank. The score that is assigned to this menu option may be determined by scoring algorithm 628 based on the amount of time remaining until the due date of the credit card payment, that is, the score increases as the due date approaches. The presentation of the menu option may also include an indication when the minimum payment is due (e.g., "Due on Wednesday"). Of course, if the user has already made the minimum payment, or if the user has configured an auto-pay option, then the score may be assigned to zero. The same approach may be taken for scoring algorithm 630 (which assigns a score to a menu option to make a mortgage payment) and for scoring algorithm 632 (which assigns a score to a menu option to pay other bills, such as utility, cable, or the like, via bill pay logic 111). For bills that are paid to other entities, if the actual due date of the bill is not known, the score may be assigned based on when the user typically pays the respective bill. Additional menu options may be provided to permit the user to select the payee, e.g., from a list of payees that the user has previously configured online bill payment.

As another example, a menu option may be provided to the user to toggle between showing or hiding account balances on the display 138 of the transaction machine. In various embodiments, the user interface logic 107 may allow the account holder 190 to choose to display the balances in each account held by the account holder 190. For example, when the account holder 190 is making a transfer from one account to another, the account balance of each account may be displayed. The score that is assigned to this menu option may be determined by scoring algorithm 634 based on the amount of time (or the number of visits to a transaction machine) it has been since the user since the user last viewed a menu option to toggle between showing or hiding account balances.

As another example, a menu option may be provided to the user to update their account information. For example, users may periodically change telephone numbers or e-mail addresses. The menu option may allow the account holder to update their phone number, address and other information from a transaction machine 130. The score that is assigned to this menu option may be determined by scoring algorithm 636 based on the amount of time (or the number of visits to a transaction machine) it has been since the user since the user last viewed a menu option to toggle between showing or hiding account balances. As another example, if there is reason to believe that the user's account information is not up to date (e.g., because the user has not responded to previous attempts to reach the user), then the menu option may be assigned a higher score.

As another example, a menu option may be provided to the user to donate change to charity. When a user makes a deposit using the deposit mechanism 132, the user interface logic 107 may present the account holder with an opportunity to donate the change or any portion of a deposit to an account holder's previously chosen charity. In another embodiment, a single national charity may be presented (e.g., the American Red Cross after a natural disaster). In various embodiments, the account management logic 103 may store the amounts that were donated over the course of a year in the account database 127 and present an annual receipt that may be used for tax preparation purposes. In another embodiment, the list of donations that were made earlier may be accessible to an account holder at a transaction machine 130. The score that is assigned to this menu option may be assigned by scoring algorithm 638 based on whether and how many times the user has previously viewed this menu option and made a donation.

As another example, a menu option may be provided to the user to view alerts. The alerts may be communications from the bank computer system 101 to the user. In an example embodiment, the selection of the alert menu option may present the account holder with further detail regarding the alert. The alerts may inform the user regarding other account related information such as being overdrawn or the like. As another example, the alerts may relate to the use of an envelope-free or non-envelope-free transaction machine. For example, if the user has never used an envelope-free transaction machine, the alert may comprise a reminder to not use an envelope when making a deposit. The alert may also advise of the appropriate procedure for depositing cash and checks together or depositing cash or check separately. As another example, the alert may be a weather-related alert. For example, the alert may advise the user not to insert wet checks into the deposit mechanism 134 if it is raining. As will be appreciated, if sufficiently important, such alerts may also be provided in another format, such as a splash screen that breaks the normal flow of screens provided to a user as would otherwise have been dictated based on the menu selections and other selections made by the user at the transaction machine 130. The score that is assigned to this menu option may be assigned by scoring algorithm 640 based on whether any alerts exist to be given to the user and the urgency of such alerts.

As another example, a menu option may be provided to the user to view local offers. The local offers may, for example, relate to products and services that may be purchased in the vicinity of the transaction machine 130. In various embodiments, the local offers may be custom generated for the user on the user's past purchase activities. For example, if the user has previously visited a particular restaurant in the vicinity of the transaction machine 130 (as indicated, for example, by credit card transaction records stored in the account database 127), then the local offers may relate to the restaurant that user has previously visited. As another example, if the user has previously purchased tickets for a particular type of event (e.g., tickets for a local professional basketball team), then the local offers may relate to tickets or others offers for that type of event. Local retailers may be permitted to upload discounts and coupon information via a website interface. The score that is assigned to this menu option may be assigned by scoring algorithm 642 based on whether such local offers exist to be made to the user and how strongly the user's prior purchase activity is correlated with the offer to be made.

As another example, a menu option may be provided to the user to view a payor list after a number of checks have been deposited. In various embodiments, the deposit mechanism 134 may be configured to scan text from checks. A list may then be provided that includes the payors names and the amounts of the checks. An option may be provided to print out the list on a paper receipt that is provided for the transaction or to send an electronic message (e.g., e-mail, SMS/Text message, etc.) to a designated e-mail address, phone number, etc. The score that is assigned to this menu option may be assigned by scoring algorithm 644 based on whether the user has just deposited one or more checks.

As another example, a menu option may be provided to the user to view a deposit tracker, e.g., after a deposit has been made. In an example embodiment, the deposit tracker provides a visual representation (e.g., a pie chart) showing the amount of deposit funds and the source(s) of the deposit funds. The method of deposit may be cash deposited, direct electronic deposit or identity of each payor from checks. For example, the deposit tracker provide a chart showing that 30% of the balances were from cash and 10% from direct deposit. The remaining 60% may be broken down by payer names (scanned from deposited checks). The score that is assigned to this menu option may be assigned by scoring algorithm 646 based on whether the user has just deposited a significant number of checks.

As another example, a menu option may be provided to the user to view a visual representation of progress being made on savings goals. For example, the user may configure savings goals through an on-line banking area of the web site of the bank, through the transaction machine 130, or in another manner. The user may be provided with the ability to view a visual representation of how their current savings balance compares against their savings goal. The user may also be provided with the ability to view the monthly balance on their savings account over the preceding twelve months. In order to generate the charts, the account management logic 103 may query the account database 127 for the past deposit transactions and account balances. The score that is assigned to this menu option may be assigned by scoring algorithm 648 based on whether the user has established savings goals and the amount of time (or the number of visits to a transaction machine) it has been since the user since the user last viewed a menu option to access the savings tracker.

As will be appreciated, the scores that are assigned to the menu options may also take into consideration other parameters. For example, the user interface logic 107 may define a limited number of personas and categorize the user as belonging to one of the personas based on their activity profile information. For example, one persona may be small business users. Users that are identified as fitting that persona may be provided a predefined set of menu options that targets small business users. As another example, another persona may be users that only conduct withdrawal transactions at transaction machines. Users that are identified as fitting that person may be provided with a larger number of "Fast Cash" withdrawal menu options and fewer menu options relating to other services. Other personas may be defined based on spending habits (as indicated by credit card purchases) or other parameters such as demographics. The user interface logic 107 may assess menu choices made by similarly situated account holders. Menu options that become popular with other some users that have been categorized as fitting a particular persona may then be provided to other users fitting that persona.

While the above menu options are described as being provided as part of a customized user interface, it will be appreciated that such menu options may also be provided as a standard (non-customized) offering to the customer. For example, by selecting the menu option 206 for other services in FIG. 2, the user may be taken to additional, lower level menus that include some or all of the menu options described herein, as well as potentially other menu options.

Figure 7:
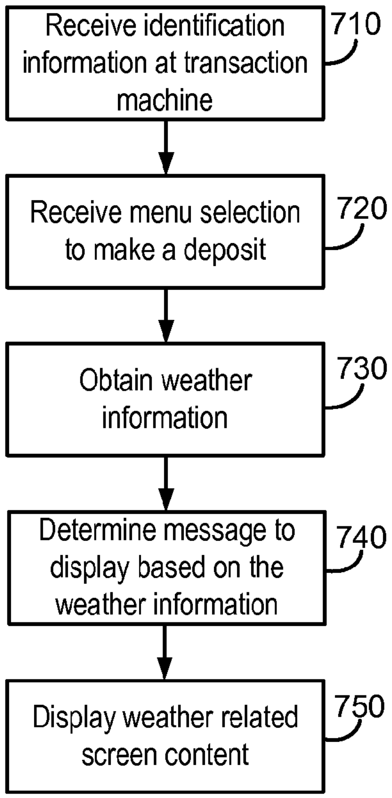
FIG. 7 shows a process for determining whether to display a weather-related alert at a transaction machine.

Referring now to FIG. 7, FIG. 7 is a process that may be implemented using the system in FIG. 1. As previously mentioned, one example of an alert that may be given (either accessible through a menu or as a splash screen) is an alert advising the user not to insert wet checks into the deposit mechanism 134 if it is raining. FIG. 7 shows a process for generating such an alert.

At step 710, the transaction machine 130 receives account holder identification information. The identification information includes information on a transaction card, and personal identification number (PIN). The identification information from the transaction machine may be transmitted to a user interface logic 107.

At step 720, the user interface logic 107 receives a menu selection from the user indicating that the user wishes to make a deposit. At step 730, the user interface logic 107 obtains weather related information for the geographic location at which the transaction machine 130 is located. For example, the weather information may be obtained from a weather sensor 180 that is connected to the transaction machine 130. Weather sensor 180 may include one or more of a rain gage, anemometers, barometer, thermometer and hygrometer. As another example, the user interface logic 107 may query weather service logic 121 for weather information relating to the geographic location of the transaction machine 130. The weather sensor 180 and/or the weather service logic 121 may be used to determine that the weather outside the transaction machine 130 is raining, snowing, windy or sunny.

At step 740, the user interface logic 107 may determine a message to display to the account holder based on the weather information received from the weather sensor 180 and the weather service logic 121. For example, if it is raining near the transaction machine 130, a message may be displayed instructing the user not to insert wet checks into the transaction machine 130. At step 750, the message is displayed to the user, e.g., in the form of an alert or a splash screen.

Figure 8:
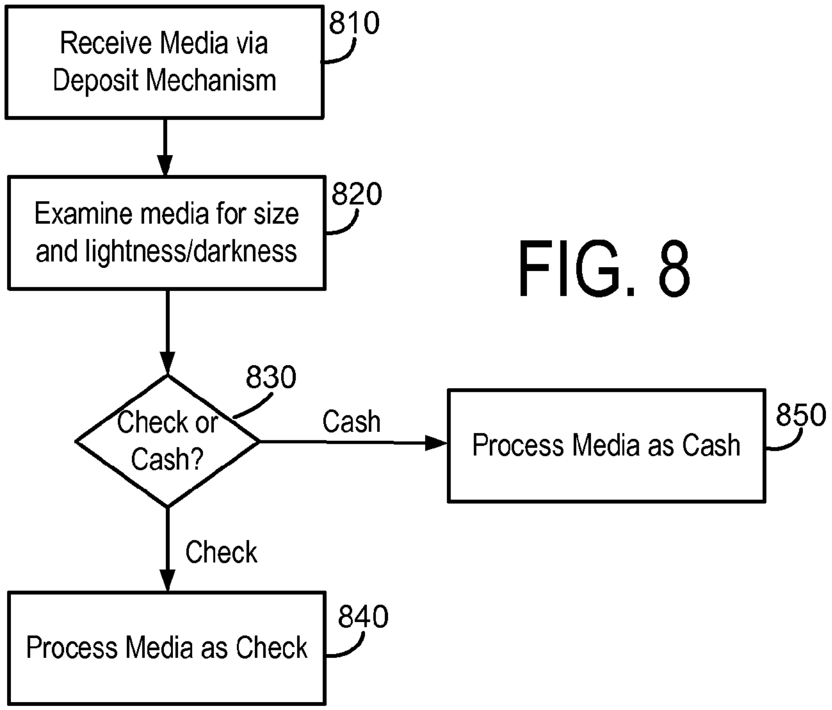
FIG. 8 shows a process for operation of a deposit mechanism.

Referring now to FIG. 8, FIG. 8 shows a process for operation of the deposit mechanism 134. In one embodiment, the deposit mechanism 134 may be configured to accept envelop-free deposits of cash and/or checks. One example embodiment of the deposit mechanism 134 may include a scanner capable of scanning images from various papers placed in the deposit mechanism 134. In various embodiments, the deposit mechanism 134 may allow customers to insert cash and check together and the transaction machine 130 can read calculate the deposit amount for cash and check at the same time. The transaction machine 130 may be configured with different reading systems for cash and checks.

At step 810, deposit media (cash or checks) is received by the deposit mechanism 134. At step 820 the media is scanned and examined for size and lightness/darkness. At step 830, based on the size and lightness/darkness, it is determined whether the media is cash or checks. If the media is checks, then the media is processed as checks (step 840). If the media is cash, then the media is processed as cash (step 850).

The embodiments of the methods and system have been described with reference to drawings. The drawings illustrate certain details of specific embodiments that implement the systems and methods and programs of the present invention. However, describing the invention with drawings should not be construed as imposing on the invention any limitations that may be present in the drawings. The embodiments described above contemplate methods, systems and program products stored on any non-transitory machine-readable storage media for accomplishing its operations. The embodiments may be implemented using an existing computer processor, or by a special purpose computer processor incorporated for this or another purpose or by a hardwired system.

As noted above, embodiments can include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable storage media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, logics, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method, comprising:

receiving identification information at a transaction machine, the identification information being associated with an account holder;

accessing, using the identification information, activity profile information for the account holder, the activity profile information retrieved from an account database of a banking computer system remote from the transaction machine, the activity profile information comprising information regarding transactions the account holder has performed at transaction machines during a predetermined preceding time period;

tabulating and ranking the transactions the account holder has performed at the transaction machines during the predetermined preceding time period according to a dollar amount and an account number of each of the transactions;

determining screen content for the transaction machine based on the activity profile information, wherein the screen content comprises a main menu, and wherein determining the screen content comprises personalizing the main menu based on the ranking of the transactions the account holder has performed at the transaction machines during the predetermined preceding time period; and displaying the screen content to the account holder via a display screen of the transaction machine.

2. A method according to claim 1, wherein the activity profile information comprises information regarding activities of the account holder during prior transactions at transaction machines.

3. A method according to claim 1, wherein the activity profile information comprises information regarding types of transactions the account holder has previously performed at transaction machines.

4. A method according to claim 1, further comprising:

tracking information regarding types of transactions the account holder has previously performed at transaction machines; and assigning the account holder to one of a plurality of personas based on the information regarding types of transactions the account holder has previously performed at transaction machines.

5. A method according to claim 4, wherein determining the screen content comprises selecting a set of menu options to display to the account holder based on the assigned persona; and wherein displaying the screen content comprises displaying the selected set of menu options to the account holder.

6. A method according to claim 4, wherein determining the screen content further comprises identifying a product purchased by other customers also having the assigned persona; and wherein displaying the screen content comprises displaying a menu option to purchase the identified product.

7. A method according to claim 1, wherein the activity profile information comprises an indication that the account holder has uploaded an image, and wherein displaying the screen content comprises displaying the image as a background.

8. A method according to claim 1, wherein the activity profile information comprises an indication whether the user has changed font sizes at the transaction machines, and wherein the screen content is determined so as to accommodate the selected font size.

9. A method according to claim 1, wherein during the determining step, the screen content is further determined based on a transaction machine location.

10. A method according to claim 9, wherein the transaction machine location is a location of a transaction machine that accepts envelope-free check deposits, wherein the activity profile information comprises an indication of a number of times the account holder has used transaction machines that accept envelope-free check deposits, and wherein the screen content includes instructions for the account holder regarding usage of the transaction machine to make an envelope-free check deposit.

11. A method according to claim 9, wherein the screen content comprises advertising for a business that is located near the transaction machine location.

12. A method according to claim 11, further comprising printing, on a transaction machine receipt provided to the account holder at the transaction machine, a coupon for the business that is located near the transaction machine location.

13. A method according to claim 1, wherein the activity profile information comprises an indication that the account holder specified a preference regarding whether account balances are displayed, wherein displaying the screen content comprises displaying the account balances depending on the preference specified by the account holder.

14. A method according to claim 1, wherein the identification information is received from a transaction card at the transaction machine, the transaction card being associated with the account holder using the transaction machine.

15. An automated teller machine system comprising:

a display; and user interface logic communicably coupled to the display and configured to:

receive identification information associated with an account holder;

access activity profile information for the account holder using the identification information, the activity profile information retrieved from an account database of a banking computer system remote from the transaction machine, the activity profile information comprising information regarding types of transactions the account holder has most frequently performed at transaction machines, the activity profile information further comprising an indication whether the user has changed font sizes at transaction machines; and determine screen content based on the activity profile information, the screen content comprising a main menu, wherein determining the screen content comprises personalizing the main menu based on the types of transactions the account holder has most frequently performed at transaction machines, and wherein the screen content is determined so as to accommodate a selected font size; and wherein the display is configured to display the screen content to the account holder.

16. An automated teller machine system according to claim 15, wherein the activity profile information comprises information regarding activities of the account holder during prior transactions at transaction machines.

17. An automated teller machine system according to claim 15, wherein the activity profile information comprises information regarding types of transactions the account holder has previously performed at transaction machines.

18. An automated teller machine system according to claim 15, further comprising:

tracking information regarding types of transactions the account holder has previously performed at transaction machines; and assigning the account holder to one of a plurality of personas based on the information regarding types of transactions the account holder has previously performed at transaction machines.

19. An automated teller machine system according to claim 18, wherein determining the screen content comprises selecting a set of menu options to display to the account holder based on the assigned persona; and wherein displaying the screen content comprises displaying the selected set of menu options to the account holder.

20. An automated teller machine system according to claim 18, wherein determining the screen content further comprises identifying a product purchased by other customers also having the assigned persona; and wherein displaying the screen content comprises displaying a menu option to purchase the identified product.

21. An automated teller machine system according to claim 15, wherein the activity profile information comprises an indication that the account holder has uploaded an image, and wherein displaying the screen content comprises displaying the image as a background.

22. An automated teller machine system according to claim 15 wherein, during the determining step, the screen content is further determined based on a transaction machine location.

23. An automated teller machine system according to claim 22, wherein the transaction machine location is a location of a transaction machine that accepts envelope-free check deposits, wherein the activity profile information comprises an indication of a number of times the account holder has used transaction machines that accept envelope-free check deposits, and wherein the screen content includes instructions for the account holder regarding usage of the transaction machine to make an envelope-free check deposit.

24. An automated teller machine system according to claim 22, wherein the screen content comprises advertising for a business that is located near the transaction machine location.

25. An automated teller machine system according to claim 24, further comprising printing, on a transaction machine receipt provided to the account holder at the transaction machine, a coupon for the business that is located near the transaction machine location.

26. An automated teller machine system according to claim 15, wherein the activity profile information comprises an indication that the account holder specified a preference regarding whether account balances are displayed, and wherein displaying the screen content comprises displaying the account balances depending on the preference specified by the account holder.

27. An automated teller machine system according to claim 15, further comprising a transaction card reader configured to receive the identification information from a transaction card, the transaction card being associated with the account holder using the automated teller machine.

* * * * *